(12) United States Patent
Watanabe

(10) Patent No.: US 7,039,324 B2
(45) Date of Patent: May 2, 2006

(54) METHOD, DEVICE, AND SYSTEM FOR REGENERATING OPTICAL SIGNAL

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 710 days.

(21) Appl. No.: 09/774,686

(22) Filed: Feb. 1, 2001

(65) Prior Publication Data

US 2001/0013965 A1 Aug. 16, 2001

(30) Foreign Application Priority Data

Feb. 14, 2000 (JP) ............................. 2000-034454

(51) Int. Cl.
*H04B 10/00* (2006.01)

(52) U.S. Cl. ...................... 398/158; 398/140; 398/141; 398/147; 398/146; 398/148; 398/173; 398/175; 398/179; 398/79; 398/80; 398/81; 398/97; 385/24; 385/37; 385/27; 385/1; 385/38; 385/122; 385/123

(58) Field of Classification Search ................. 398/140, 398/141, 147, 146, 148, 173, 175, 179, 79, 398/80, 81, 97; 385/27, 1, 38, 122, 123, 385/24, 37

See application file for complete search history.

(56) References Cited

U.S. PATENT DOCUMENTS 6,141,129 A * 10/2000 Mamyshev ................. 398/180
6,233,385 B1 * 5/2001 Taneda et al. .............. 385/122
6,243,181 B1 * 6/2001 Golovchenko et al. ..... 398/146
6,408,114 B1 * 6/2002 Hamaide et al. ............. 385/27
6,538,788 B1 * 3/2003 Franco et al. ............... 398/158
6,738,542 B1 * 5/2004 Doran et al. .................. 385/24
2002/0041618 A1 * 4/2002 Watanabe et al. ............ 372/76

FOREIGN PATENT DOCUMENTS

| EP | 0 375 253 | 6/1990 |
| EP | 0 862 284 A2 | 9/1998 |
| JP | 11284261 | 10/1999 |

OTHER PUBLICATIONS

European Search Report mailed Oct. 13, 2005.

* cited by examiner

*Primary Examiner*—Hanh Phan
(74) *Attorney, Agent, or Firm*—Staas & Halsey LLP

(57) ABSTRACT

The present invention relates to a method for regenerating an optical signal suitable for WDM (wavelength division multiplexing). In this method, an optical signal is supplied to an optical waveguide structure (e.g., optical fiber) for providing a nonlinear effect. As a result, the optical signal undergoes chirp induced by the nonlinear effect. Then, an output optical signal output from the optical waveguide structure is supplied to an optical filter to thereby remove a small-chirp component from the output optical signal. By removing the small-chirp component from the output optical signal in the form of pulse, intensity fluctuations or accumulated noise especially at a top portion and/or a low-power portion of the pulse can be removed. Accordingly, the optical signal can be regenerated independently of the bit rate, pulse shape, etc. of the optical signal.

32 Claims, 10 Drawing Sheets

2 ; OPTICAL FIBER ($\beta_2$)

4 ; SIGNAL PULSE ($\lambda_s$)   10 ; REGENERATED PULSE ($\lambda_s$)

BSF ($\lambda_s$)

6
8

F I G. 6
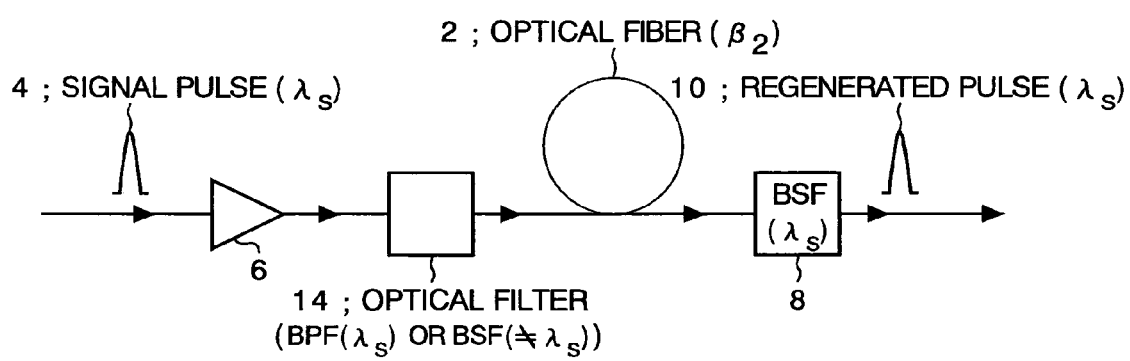

F I G. 1 2
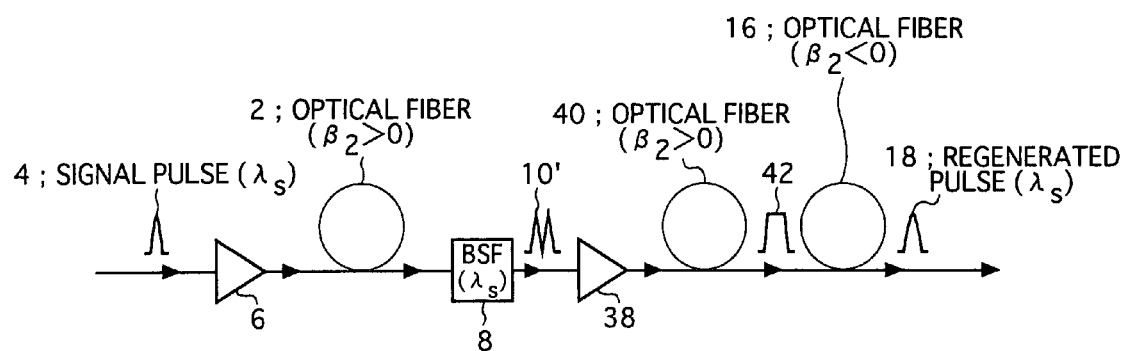

METHOD, DEVICE, AND SYSTEM FOR REGENERATING OPTICAL SIGNAL

BACKGROUND OF THE INVENTION

1. Field of the Invention

The present invention relates to a method, device, and system for regeneration of an optical signal.

2. Description of the Related Art

In an optical fiber communication system that has been put to practical use in recent years, a reduction in signal power due to transmission line loss, coupling loss, etc. is compensated by using an optical amplifier such as an erbium doped fiber amplifier (EDFA). The optical amplifier is an analog amplifier, which functions to linearly amplify a signal. In this kind of optical amplifier, amplified spontaneous emission (ASE) noise generated in association with the amplification is added to cause a reduction in signal-to-noise ratio (S/N ratio), so that the number of repeaters is limited to result in the limit of a transmission distance. Further, waveform degradation due to the chromatic dispersion owned by an optical fiber and the nonlinear optical effects in the fiber is another cause of the transmission limit. To break down such a limit, a regenerative repeater for digitally processing a signal is required, and it is desirable to realize such a regenerative repeater. In particular, an all-optical regenerative repeater capable of optically performing is important in realizing a transparent operation independent of the bit rate, pulse shape, etc. of a signal.

The functions required for the all-optical regenerative repeater are amplitude restoration or reamplification, timing restoration or retiming, and waveform shaping or reshaping. Of these functions, special attention is paid to the reamplification function and the reshaping function in the present invention to provide an all-optical regenerative repeater in an optical communication system or a signal regenerator at any node point in an optical network by using frequency chirp due to a self-phase modulation (SPM) effect exhibited during propagation of an optical pulse in an optical waveguide structure such as an optical fiber.

The most general one of conventional waveform shapers or optical regenerators is an OE type waveform shaper so designed as to once convert an input optical signal into an electrical signal by using a photodetector such as a photodiode, next subject this electrical signal to electrical waveform shaping by using a logic circuit, and thereafter modulate laser light by the waveform-shaped signal. Such an OE type waveform shaper is used for a regenerative repeater in a conventional optical communication system. However, the operating speed of the OE type waveform shaper is limited by an electronic circuit for signal processing, so that the bit rate of an input signal to the regenerative repeater is fixed to a low rate.

On the other hand, as an all-optical waveform shaper capable of performing all kinds of processing in optical level, there has already been proposed various ones including a nonlinear switch accompanying wavelength conversion, such as a nonlinear optical loop mirror (NOLM) or a Michelson or Mach-Zehnder interferometer, and a switch employing a saturable absorber (see Japanese Patent Application Nos. 11-133576, 11-239854, and 11-293189).

In the prior art mentioned above, however, there is a problem that a signal of only one channel can be processed at a time. That is, in the case that the optical signal to be reproduced is WDM signal light obtained by wavelength division multiplexing a plurality of optical signals having different wavelengths, it is necessary to carry out a method for regenerating the optical signal plural times or to use a plurality of devices for regenerating the optical signals. As a result, the repeated course of carrying out the method is troublesome or the overall configuration of the plural devices become large in scale.

SUMMARY OF THE INVENTION

It is therefore an object of the present invention to provide a novel method, device, and system for regeneration of an optical signal independent of the bit rate, pulse shape, etc. of the optical signal.

It is another object of the present invention to provide a method, device, and system for regeneration of an optical signal suitable for WDM (wavelength division multiplexing).

Other objects of the present invention will become apparent from the following description.

In accordance with a first aspect of the present invention, there is provided a method for regenerating an optical signal. In this method, an optical signal is supplied to an optical waveguide structure for providing a nonlinear effect. As a result, the optical signal undergoes frequency chirp induced by the nonlinear effect. Then, an output optical signal output from the optical waveguide structure is supplied to an optical filter to thereby remove a small-chirp component from the output optical signal.

By removing the small-chirp component from the output optical signal in the form of pulse, intensity fluctuations or accumulated noise especially at a top portion and/or a low-power portion of the pulse can be removed. Accordingly, the optical signal can be regenerated independently of the bit rate, pulse shape, etc. of the optical signal.

Further, as the optical filter for removing the small-chirp component, an optical filter having a plurality of bands, such as an interleave filter and an AOTF (acousto-optic tunable filter) can be used. Accordingly, the present invention is applicable to WDM signal light obtained by wavelength division multiplexing a plurality of optical signals having different wavelengths to effect simultaneous regeneration of the plural optical signals.

In accordance with a second aspect of the present invention, there is provided a device for regenerating an optical signal. This device comprises an optical waveguide structure for providing a nonlinear optical effect so that frequency chirp is generated in an optical signal input, and an optical filter for accepting an output optical signal output from the optical waveguide structure. The optical filter functions to remove a small-chirp component from the output optical signal.

In the present invention, an optical fiber for providing normal dispersion may be used as the optical waveguide structure, thereby effectively generating the chirp in the optical signal.

The optical signal to be input into the optical waveguide structure may be amplified by an optical amplifier such as an EDFA (erbium doped fiber amplifier), so as to effectively generate the chirp in the optical signal.

In accordance with a third aspect of the present invention, there is provided a system for regenerating an optical signal. This system comprises an optical fiber transmission line for transmitting an optical signal, and an optical signal regenerating device for accepting an optical signal output from the optical fiber transmission line. The optical signal regenerating device may be provided in accordance with the second aspect of the present invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 6 is a block diagram showing a third preferred embodiment of the device for regenerating an optical signal according to the present invention;

FIG. 12 is a block diagram showing a seventh preferred embodiment of the device for regenerating an optical signal according to the present invention.

DETAILED DESCRIPTION OF THE PREFERRED EMBODIMENTS

Some preferred embodiments of the present invention will now be described in detail with reference to the attached drawings.

Now consider the case that an optical pulse $U(z,T)$ having a width $T_0$ and a peak power $P_0$ propagates in an optical fiber, where T is time in a coordinate system moving with the optical pulse. In the case that the chromatic dispersion $\beta_2$ of this optical fiber is not so large and the dispersion length $L_D = T_0^2/|\beta_2|$ is sufficiently larger than the nonlinear length $L_{NL} = 1/\gamma P_0$ ($\gamma$ is the third-order nonlinear coefficient) to the optical pulse ($L_D \gg L_{NL}$), the phase shift $\phi_{NL}(z,T)$ by SPM (self-phase modulation) is expressed as follows:

$$\phi_{NL}(z,T) = |U(0,T)|^2 (z_{eff}/L_{NL}) \tag{1}$$

where $z_{eff} = [1-\exp(-\alpha z)]/\alpha$ is the effective (nonlinear) interaction length.

In this case, the chirp $\delta\omega_{NL}$ is given by the following expression.

$$\delta\omega_{NL} = -\partial\phi_{NL}/\partial T = -[\partial |U(0,T)|^2/\partial T](z_{eff}/L_{NL}) \tag{2}$$

where $|U(0,T)|^2$ corresponds to the peak power, so that Eq. (2) shows that the chirp of the optical pulse becomes larger at its portion having a larger power slope. Further, the longer the propagated distance z and the shorter the nonlinear length $L_{NL}$ (the larger the value $\gamma P_0$), the larger the chirp. Thus, the chirp induced by SPM gives a new frequency component to the optical pulse, resulting in spectral broadening.

Consider the case of inputting an optical pulse of m-th order super-Gaussian type expressed by Eq. (3) as an example into an optical fiber.

$$U(0,T) = \exp(-T^{2m}/2T_0^{2m}) \tag{3}$$

In this case, the chirp $\delta\omega_{NL}$ is given by the following expression.

$$\delta\omega_{NL} = (2m/T)(z_{eff}/L_{NL})(T/T_0)^{2m-1} \exp[-(T/T_0)^{2m}] \tag{4}$$

In particular, for a normal Gaussian pulse (m=1), the chirp $\delta\omega_{NL}$ becomes as follows:

$$\delta\omega_{NL} = (2/T)(z_{eff}/L_{NL})(T/T_0)\exp(-T^2/T_0^2) \tag{5}$$

Figure 1A:
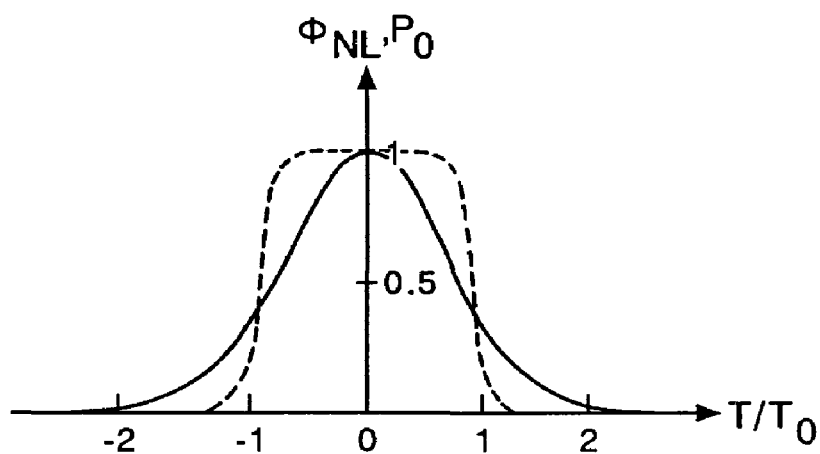
FIGS. 1A and 1B are graphs for illustrating frequency chirp during propagation of a Gaussian pulse and a super-Gaussian pulse in an optical fiber.
Figure 1B:
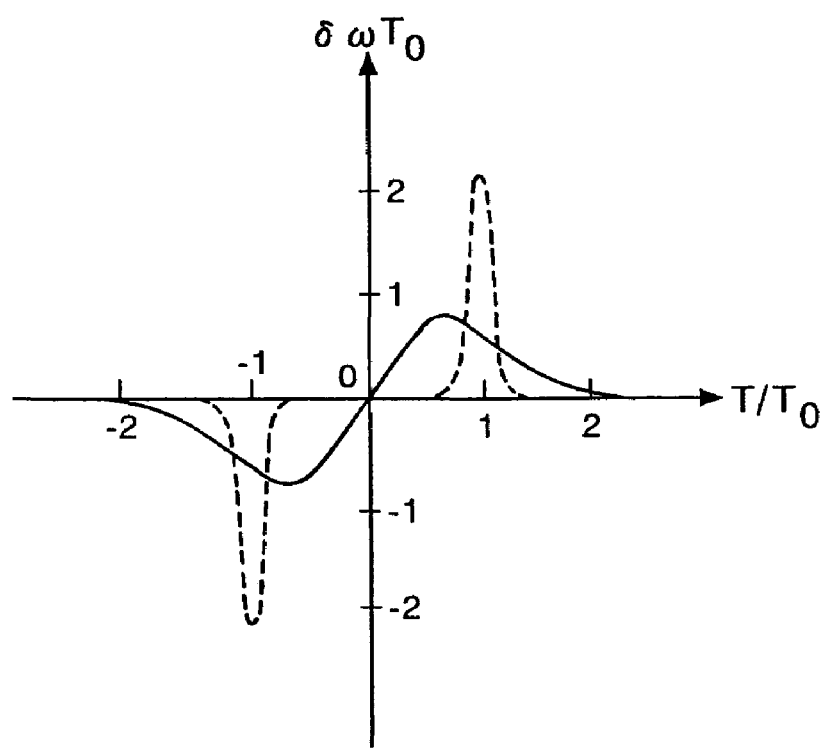

Eqs. (3) to (5) are illustrated in FIGS. 1A and 1B. In FIGS. 1A and 1B, the solid lines show the case of a Gaussian pulse (m=1), and the dashed lines show the case of a super-Gaussian pulse (m=3). The chirp is generated along the slope of the pulse, wherein $\delta\omega<0$ at a leading portion and $\delta\omega>0$ at a trailing portion (up-chirp). Further, in the Gaussian pulse, the chirp is substantially linear near the peak of the pulse.

FIGS. 1A and 1B show that the temporal component of the pulse can be decomposed on the spectrum. The particularly important point is that a portion near the center of the slope where the chirp is large can be distinguished from a portion near the peak and edge portions where the chirp is small. By utilizing this point, minute power fluctuations or accumulated noise near the peak and the edges can be removed by using an optical filter.

That is, the optical pulse is propagated in an optical fiber to forcibly generate SPM and separate the optical pulse into a large-chirp portion and a small-chirp portion in terms of frequency. Thereafter, a spectral component near the small-chirp portion ($\delta\omega \approx 0$) is collectively removed by using an optical bandstop filter (BSF). Thereafter, a chirp reversed in sign is given to the pulse to compensate for the chirp, thereby restoring the original waveform of the pulse from which noise has been removed.

As a method for giving such a reverse chirp, it is known to use the chromatic dispersion (GVD) of an optical fiber, for example. In this method, an optical pulse propagating in a fiber having a GVD of $\beta_2$ can obtain an up-chirp in the case of $\beta_2>0$, i.e., a normal dispersive fiber as in the case of SPM or obtain a down-chirp in the case of $\beta_2<0$, i.e., an anomalous dispersive fiber. Thus, the chirp induced by SPM can be compensated by propagating the optical pulse in an anomalous dispersive fiber.

To effectively generate the SPM-induced chirp, the third-order nonlinear coefficient $\gamma$ of an optical fiber must be increased. In general, the third-order nonlinear coefficient $\gamma$ of an optical fiber is expressed as follows:

$$\gamma = \omega n_2/cA_{eff} \tag{6}$$

where $\omega$ is the optical angular frequency, c is the velocity of light in a vacuum, and $n_2$ and $A_{eff}$ are the nonlinear refractive index and the effective core area of the optical fiber, respectively. The nonlinear coefficient $\gamma$ of a conventional DSF (dispersion shifted fiber) is as small as about 2.6 $W^{-1}km^{-1}$, so a fiber length of several km to 10 km or more is necessary to obtain sufficient chirp. In general, for generation of sufficiently large chirp with a short fiber length, it is effective to increase a light intensity by increasing the nonlinear refractive index $n_2$ in Eq. (6) or by reducing a mode field diameter (MFD) corresponding to the effective core area $A_{\it eff}$ in Eq. (6). The nonlinear refractive index $n_2$ can be increased by doping the cladding with fluorine or the like or by doping the core with a high concentration of $GeO_2$, for example. By doping the core with 25 to 30 mol % of $GeO_2$, a large value of $5 \times 10^{-20}$ $m^2/W$ or more (about $3.2 \times 10^{-20}$ $m^2/W$ for a usual silica fiber) can be obtained as the nonlinear refractive index $n_2$. On the other hand, the MFD can be reduced by designing a relative refractive-index difference $\Delta$ between the core and the cladding or by designing the core shape. For example, by doping the core with 25 to 30 mol % of $GeO_2$ and setting the relative refractive-index difference $\Delta$ to 2.5 to 3.0%, a small value of less than 4 µm can be obtained as the MFD. Owing to the combined effects of increasing the nonlinear refractive index $n_2$ and reducing the MFD, an optical fiber having a large value of 15 $W^{-1}km^{-1}$ or more as the nonlinear coefficient $\gamma$ can be obtained.

Further, to make the dispersion length sufficiently larger than the nonlinear length or to compensate for the chirp, it is desirable that the GVD of such a fiber is arbitrarily adjustable. This point can also be satisfied by setting each parameter in the following manner. That is, in general, a dispersion in a usual DCF increases in a normal dispersion region with an increase in refractive index difference $\Delta$ under the condition that the MFD is set constant. On the other hand, the dispersion decreases with an increase in core diameter, whereas the dispersion increases with a decrease in core diameter. Accordingly, the dispersion can be reduced to zero by increasing the core diameter under the condition that the MFD is set to a certain value in a given wavelength band. Conversely, a desired normal dispersion fiber can also be obtained.

These methods allow realization of a high nonlinear dispersion shifted fiber (HNL-DSF) having a high nonlinear coefficient $\gamma$ of 15 $W^{-1}km^{-1}$ or more or a DCF (dispersion compensating fiber). For example, the fiber having a nonlinear coefficient $\gamma$ of 15 $W^{-1}km^{-1}$ can achieve the same conversion efficiency as that by a usual DSF even when the fiber length is reduced to about $2.6/15 \approx 1/5.7$ as compared with the usual DSF. As mentioned above, the usual DSF requires a length of about 10 km for sufficient chirp. To the contrary, the HNL-DSF or the DCF as mentioned above can obtain a similar effect with a reduced length of about 1 to 2 km. Practically, loss in the fiber is reduced in an amount corresponding to a decrease in fiber length, so that the fiber can be further shortened to obtain the same efficiency.

Figure 2:
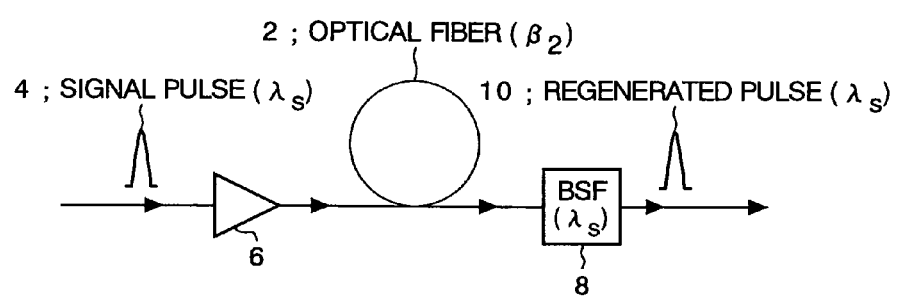
FIG. 2 is a block diagram showing a first preferred embodiment of the device for regenerating an optical signal according to the present invention.

FIG. 2 is a block diagram showing a first preferred embodiment of the device for regenerating an optical signal according to the present invention. An optical fiber 2 is used as an optical waveguide structure for providing a nonlinear optical effect. The GVD of the optical fiber 2 is $\beta_2$, and the optical fiber 2 gives a normal or anomalous dispersion and a third-order nonlinear optical effect to an optical signal supplied, for example.

A signal pulse 4 as an optical signal having a center wavelength $\lambda_s$ is amplified by an optical amplifier 6 to obtain a power enough to generate a required chirp. Thereafter, the signal pulse 4 is input into the optical fiber 2. In the optical fiber 2, the chirp is generated by SPM. An output optical signal thus chirped and output from the optical fiber 2 is passed through an optical bandstop filter (BSF) 8 having a stop band whose center wavelength is $\lambda_s$, thereby removing a small-chirping component and outputting a regenerated pulse 10 having a center wavelength $\lambda_s$.

The small-chirping component mainly includes fluctuations in off-power (zero coded) component from a zero point (e.g., waveform degradation due to GVD) and a small-slope component near the peak of the pulse. These components determine an optical signal-to-noise ratio (OSNR). Accordingly, by removing this small-chirp portion by the use of a BSF, it is possible to suppress a reduction in OSNR due to the power fluctuations, extinction ratio degradation, noise accumulation, etc. of these components.

The regeneration of an optical signal according to the present invention is primarily characterized in that it is not accompanied by wavelength conversion. Accordingly, it is possible to realize novel practical 2R (Reamplification and Reshaping) regeneration.

The degree of chirp will now be estimated to evaluate the possibility of carrying out the present invention. Let us consider the case that a pulse with $T_0=10$ ps propagates in a normal dispersive fiber with $\beta_2=10$ $ps^2/km$ and $\gamma=20$ $W^{-1}km^{-1}$. Assuming that the input power of the pulse is $P_0=100$ mW, $L_D \gg L_{NL}$ holds because $L_D=10$ km and $L_{NL}=0.5$ km. Accordingly, the influence of dispersion on the chirp is negligible.

In this case, the chirp $\delta\omega$ is 162 GHz (0.21 nm) for L=1 km. Further, in the case of $P_0=200$ mw under similar conditions, the chirp $\delta\omega$ becomes 324 GHz (0.43 nm). Further, in the case of using a pulse with $T_0=5$ ps, the chirp $\delta\omega$ becomes 333 GHz (0.43 nm) for L=0.5 km and $P_0=200$ mW. For a short pulse with 5 to 10 ps, a peak power of about 200 mW can be relatively easily realized even at a bit rate of about 40 Gb/s, for example. Further, a BSF having a bandwidth of about 0.2 nm can also be realized. Therefore, the present invention can be carried out even in consideration of the above-mentioned estimate.

Figure 3:
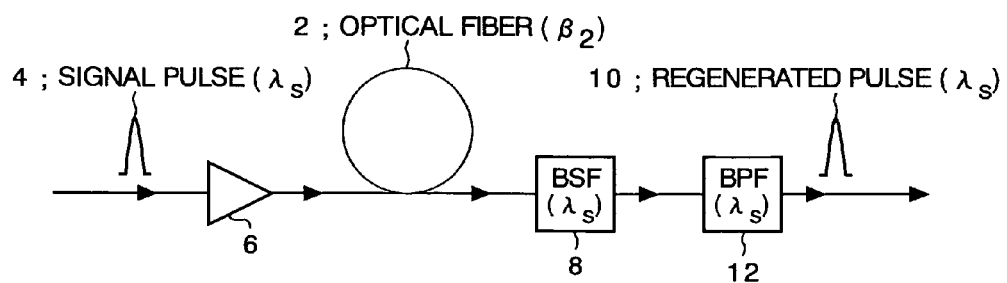
FIG. 3 is a block diagram showing a second preferred embodiment of the device for regenerating an optical signal according to the present invention.

FIG. 3 is a block diagram showing a second preferred embodiment of the device for regenerating an optical signal according to the present invention. In this preferred embodiment, the output optical signal output from the optical fiber 2 is passed not only through the optical bandstop filter 8, but also through an optical bandpass filter (BPF) 12. The center wavelength in the pass band of the bandpass filter 12 is set to $\lambda_s$. Although the bandstop filter 8 and the bandpass filter 12 are arranged in this order in the propagation direction of the optical signal, this arrangement order may be reversed.

The roles of the bandstop filter 8 and the bandpass filter 12 shown in FIG. 3 will now be described with reference to FIG. 4.

Figure 4:
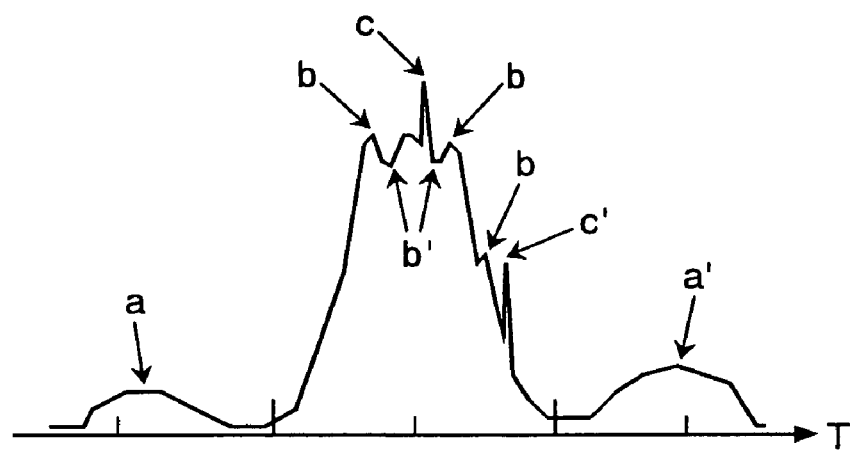
FIG. 4 is a graph for illustrating intensity fluctuations in a pulse which fluctuations are to be removed according to the present invention.

FIG. 4 shows intensity fluctuations in a signal pulse before regeneration. In FIG. 4, the horizontal axis represents time (T). The chirp by SPM at each portion of this pulse will now be considered. Portions shown by a and a' are due to amplified spontaneous emission (ASE) noise in an optical amplifier or waveform distortion by fiber transmission, for example. The portions a and a' should be essentially in zero level, and the intensity at the portions a and a' is low. Accordingly, the chirp at the portions a and a' is small and it is therefore removable by the optical bandstop filter 8.

Portions shown by b and b' show fluctuations near the peak of the pulse and on the slope, and they are mainly due to beat noise between the signal pulse and the ASE in an optical amplifier, and waveform distortion by optical fiber transmission, for example. These portions b and b' have a band equal to or slightly wider than the band of the signal, so that the slope is equal to or slightly steeper than the slope of the pulse itself. In this case, the slope is zero at the top and bottom of the intensity fluctuations. Therefore, the chirp near these portions is small, and it can be removed by the optical bandstop filter 8.

However, there may exist extremely peaky fluctuation components as shown by c and c'. At such singular points, the chirp is larger than that on the slope of the pulse itself, and the spectrum is located outside of that of a main slope. Accordingly, the fluctuations at such singular points can be removed by setting the band of the optical bandpass filter 12 to a suitable band having a width including the spectral component at the main slope portion and not including the component at each singular point.

According to this preferred embodiment, the output optical signal output from the optical fiber 2 is supplied to the optical bandpass filter 12 to remove a pulse portion having a chirp larger than that at the main slope portion of the pulse of the optical signal, thereby allowing the regeneration of the optical signal with higher accuracy as compared with the case of using only the optical bandstop filter 8.

Figure 5:
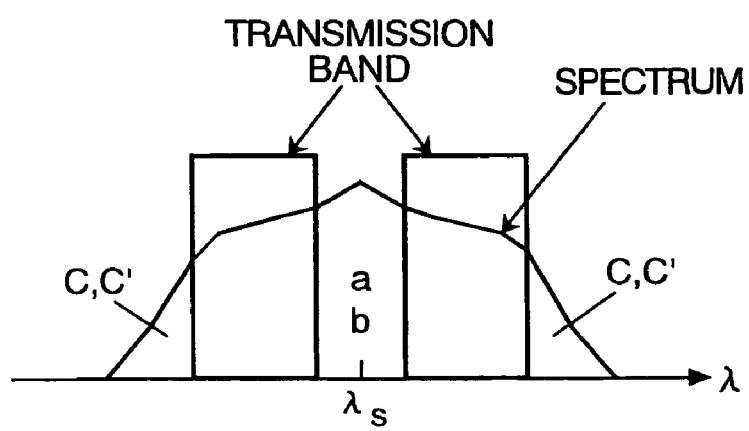
FIG. 5 is a diagram showing the removal of noises by using optical filters in the second preferred embodiment of the present invention.

FIG. 5 is a diagram for illustrating a transmission band provided by the optical bandstop filter 8 and the optical bandpass filter 12 shown in FIG. 3. In this example, two transmission bands symmetrical with respect to the center wavelength $\lambda_s$ of a signal spectrum are provided. A stop band between the two transmission bands is provided by the optical bandstop filter 8, and stop bands outside of the two transmission bands are provided by the optical bandpass filter 12. Accordingly, the stop band provided by the optical bandstop filter 8 is narrower than the pass band of the optical bandpass filter 12. The noise component shown by a, a', b, and b' in FIG. 4 can be removed by the stop band between the two transmission bands, and the noise component shown by c and c' and steep slope part between b and b' in FIG. 4 can be removed by the stop bands outside of the two transmission bands.

As the optical bandstop filter 8, a narrow-band fiber grating may be used, for example. As the optical bandpass filter 12, reflection by a fiber grating may be used or a higher-order filter such as a double-cavity type multilayer filter may be used.

While the spectrum shown in FIG. 5 has a largest intensity near the center wavelength, the shape of the spectrum can be made flat by suitably setting the dispersion or the power of the pulse. In the case that the dispersion is set to normal dispersion ($\beta_2 > 0$), the spectrum shape can be made flat (in this case, the pulse is rectangularly broadened and chirped). In an extreme case, the spectrum becomes a superbroadband white spectrum called supercontinuum (in this case, not only SPM, but also four-wave mixing or the like largely contributes to flattening of the spectrum). By applying the present invention to such a flat chirped spectrum, a constant output independent of input peak power can be obtained, so that the fluctuations near the peak can be effectively suppressed.

FIG. 6 is a block diagram showing a third preferred embodiment of the device for regenerating an optical signal according to the present invention. In contrast to the preferred embodiment shown in FIG. 2, the third preferred embodiment is characterized in that an optical filter 14 is additionally provided between the optical amplifier 6 and the optical fiber 2. The optical filter 14 is supplied with an optical signal to be input into the optical fiber 2 to remove a noise component outside of the signal band of the optical signal. For example, by using an optical bandpass filter having a pass band whose center wavelength is $\lambda_s$ as the optical filter 14, ASE noise accumulated outside the input signal band can be preliminarily removed. Alternatively, an optical bandstop filter having a stop band whose center wavelength is different from $\lambda_s$ may be used as the optical filter 14. For example, the optical bandstop filter as the optical filter 14 may be obtained by preparing two optical bandstop filters respectively acting on an up-chirped signal and a down-chirped signal, and cascading these two optical bandstop filters. Further, a fiber grating may also be used as the optical filter 14.

According to this preferred embodiment, a noise component outside of the signal band of the optical signal is preliminarily removed by the optical filter 14, thereby obtaining a high OSNR and accordingly more effectively regenerating the optical signal.

Figure 7:
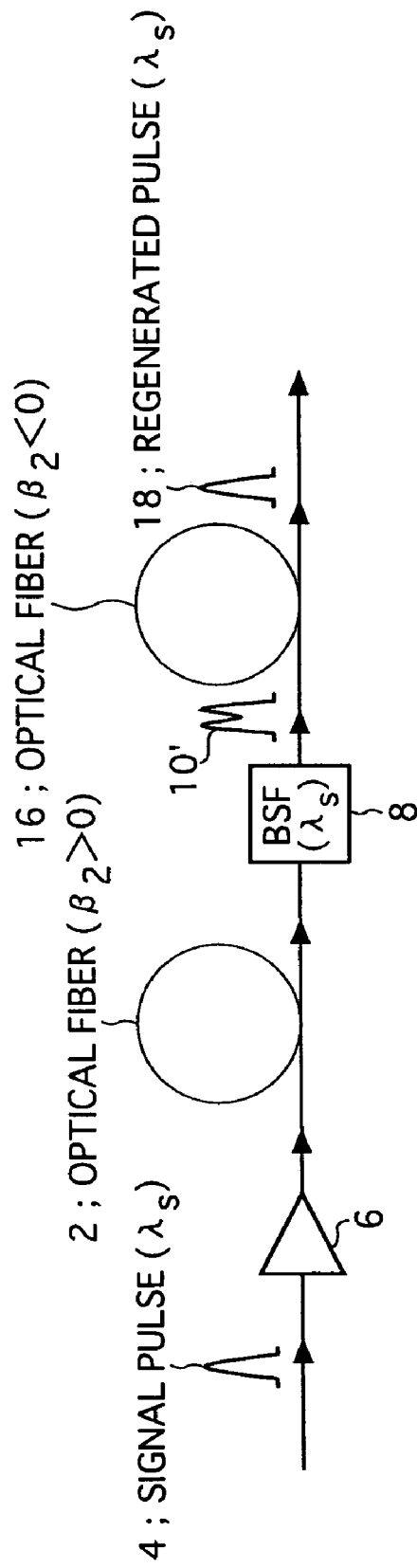
FIG. 7 is a block diagram showing a fourth preferred embodiment of the device for regenerating an optical signal according to the present invention.

FIG. 7 is a block diagram showing a fourth preferred embodiment of the device for regenerating an optical signal according to the present invention. In contrast to the preferred embodiment shown in FIG. 2, the fourth preferred embodiment is characterized in that an additional optical fiber 16 for providing dispersion having a sign reversed to that of the dispersion in the optical fiber 2 is connected to the output of the optical bandstop filter 8. The optical fiber 2 provides normal dispersion ($\beta_2 > 0$), so that up-chirp is generated by the SPM in the optical fiber 2 and there is a possibility that the output optical signal output from the optical fiber 2 and passed through the optical bandstop filter 8 may has a hole (partial reduction in intensity) near the peak as shown by reference numeral 10'. By supplying this output optical signal to the optical fiber 16 providing anomalous dispersion ($\beta_2 < 0$), the up-chirp by the SPM in the optical fiber 2 can be compensated. At this time, by suitably setting a dispersion and input power in the optical fiber 16, a pulse compression effect is obtained. Accordingly, the hole or defect near the peak of the pulse and on the spectrum can be corrected. In addition, the reduction in chirp allows suppression of waveform degradation in subsequent transmission of a regenerated pulse shown by reference numeral 18. The chirp reduction may be effected by using any other means such as a DCF, optical filter (e.g., fiber grating), and phase modulator.

It should be noted that the optical fiber 2 and the optical fiber 16 may be replaced to each other.

According to this preferred embodiment, the dispersion in the output optical signal from the optical fiber 2 is compensated by using the optical fiber 16 as a dispersion compensator. Accordingly, waveform degradation can be suppressed to thereby allow the regeneration of the optical signal with a higher accuracy.

Figure 8:
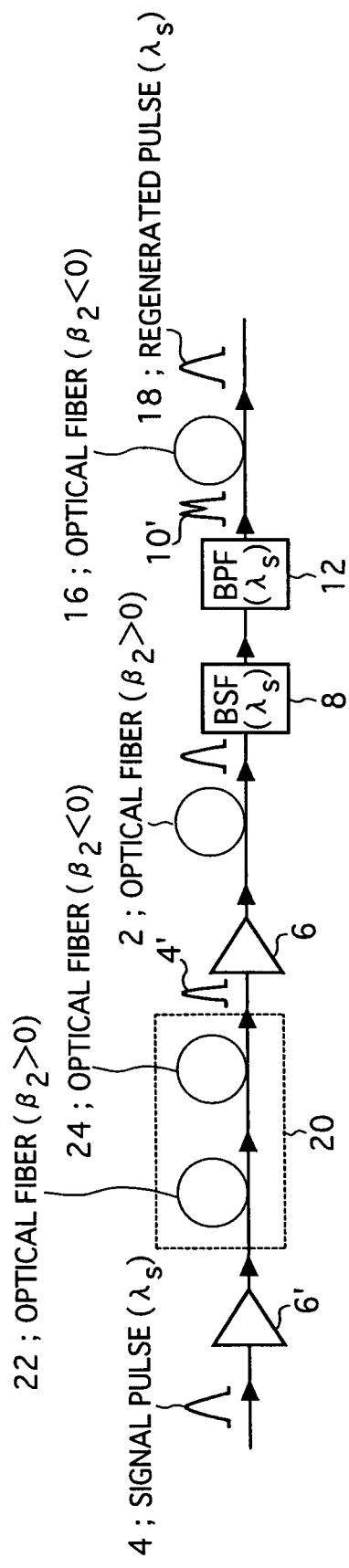
FIG. 8 is a block diagram showing a fifth preferred embodiment of the device for regenerating an optical signal according to the present invention.

FIG. 8 is a block diagram showing a fifth preferred embodiment of the device for regenerating an optical signal according to the present invention. In contrast to the preferred embodiment shown in FIG. 7, the fifth preferred embodiment is characterized in that a pulse compressor 20 is additionally connected to the input of the optical amplifier 6. Further, like the preferred embodiment shown in FIG. 3, an optical bandpass filter 12 is connected to the output of the optical bandstop filter 8. The optical fiber 16 for dispersion compensation and slight chirping compensation is connected to the output of the optical bandpass filter 12.

The pulse compressor 20 is obtained by cascading an optical fiber 22 for providing normal dispersion ($\beta_2 > 0$) and an optical fiber 24 for providing anomalous dispersion ($\beta_2 < 0$). In this case, by the combination of up-chirp in the optical fiber 22 and down-chirp in the optical fiber 24, the input optical pulse 4 is compressed as shown by reference numeral 4'. To obtain required chirping in the optical fibers 22 and 24, an optical amplifier 6' is connected to the input of the pulse compressor 20.

With this configuration, the optical signal to be input into the optical fiber 2 undergoes the pulse compression shown by reference numeral 4'. Accordingly, a noise component can be effectively removed to thereby allow high-accuracy regeneration of the optical signal.

Figure 9:
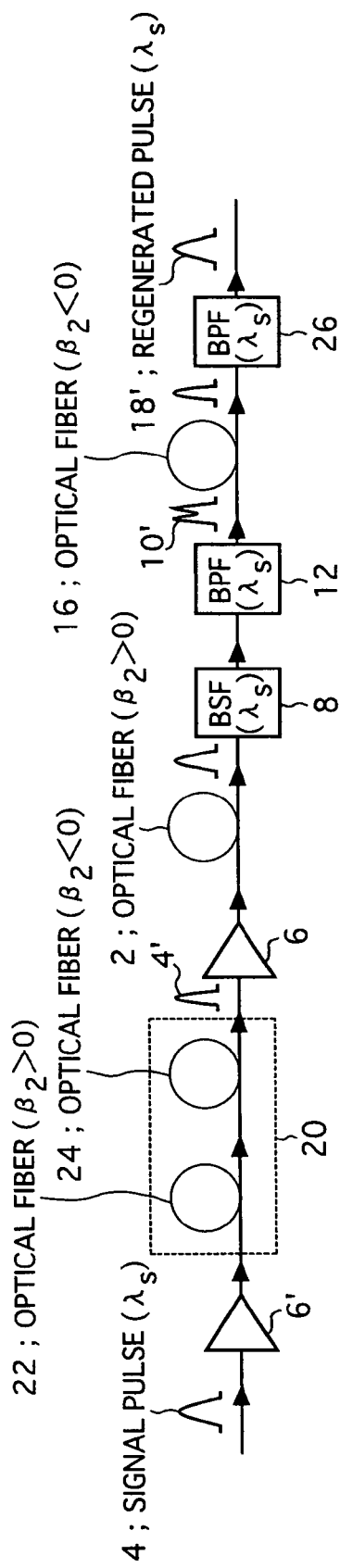
FIG. 9 is a block diagram showing a sixth preferred embodiment of the device for regenerating an optical signal according to the present invention.

FIG. 9 is a block diagram showing a sixth preferred embodiment of the device for regenerating an optical signal according to the present invention. In contrast to the preferred embodiment shown in FIG. 8, the sixth preferred embodiment is characterized in that an optical bandpass filter 26 having a relatively narrow pass band whose center wavelength is $\lambda_s$ is additionally connected to the output of the optical fiber 16. With this configuration, the regenerated pulse from the optical fiber 16 is passed through the optical bandpass filter 26, thereby restoring the original pulse width from the compressed pulse width as shown by reference numeral 18'.

In each preferred embodiment described above, the optical signal regenerating device is composed of an optical fiber, an optical filter, and an optical amplifier. Accordingly, in performing optical 2R regeneration, it is possible to obtain remarkable effects that polarization dependence is eliminated, loss is low, and multi-wavelength simultaneous regeneration is allowed. The allowance of the multi-wavelength simultaneous regeneration will now be described more specifically.

Figure 10:
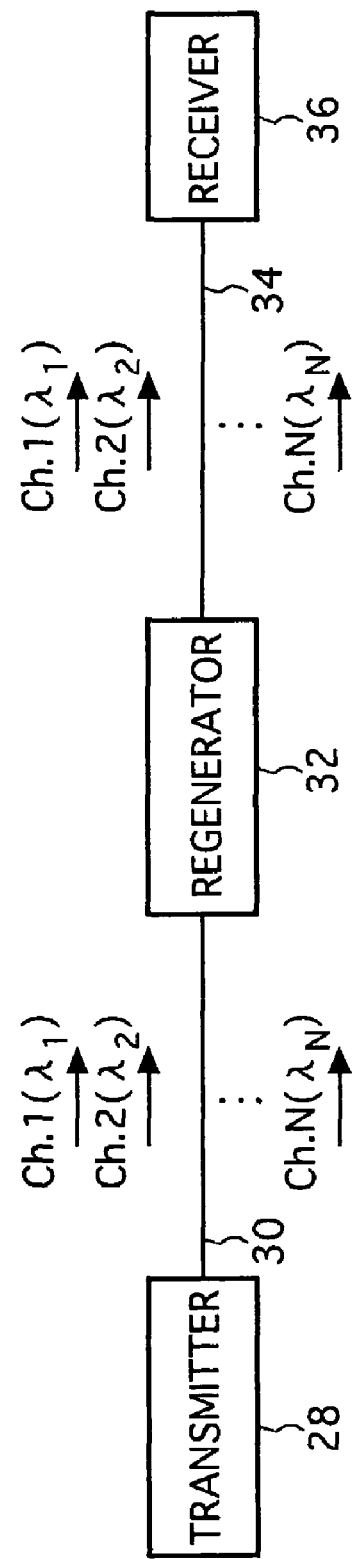
FIG. 10 is a block diagram showing a preferred embodiment of the system according to the present invention.

FIG. 10 is a block diagram showing a preferred embodiment of the system according to the present invention. This system includes an optical transmitter 28 for outputting WDM signal light obtained by wavelength division multiplexing a plurality of optical signals having different wavelengths ($\lambda_1$ to $\lambda_N$), an optical fiber transmission line 30 for transmitting the WDM signal light output from the optical transmitter 28, a regenerating device 32 to which the WDM signal light output from the optical fiber transmission line 30 is supplied, an optical fiber transmission line 34 for transmitting the WDM signal light as an output optical signal output from the regenerating device 32, and an optical receiver 36 for receiving the WDM signal light output from the optical fiber transmission line 34. The optical receiver 36 demodulates the received WDM signal light into a plurality of original optical signals.

In the case that the optical waveguide structure in the regenerating device 32 is an optical fiber, the dispersion of the optical fiber is preferably large to such an extent that crosstalk does not occur between the channels of the WDM signal light.

The regenerating device 32 may be so configured as to adopt any one of the above-mentioned preferred embodiments in accordance with the present invention. In the case of adapting the regenerating device 32 to WDM signal light, (a) band ensuring and (b) optical filter design are important. This will now be described more specifically.

(a) Band Ensuring

To allow the simultaneous regeneration of WDM signal light, the regenerating device 32 preferably has a band corresponding to the band of the WDM signal light. For example, in adopting the case of the preferred embodiment shown in FIG. 8, all of the optical fibers 2, 16, 22, and 24 and the optical amplifiers 6 and 6' preferably have bands each wider than the band of the WDM signal light. This will now be described more specifically.

The optical fiber 2 preferably has a band wide enough to uniformly give SPM to all the channels (Ch. 1 to Ch. N) of the WDM signal light. The response time of the third-order nonlinear effect in the fiber is on the order of femto-seconds, so that it can be said that a sufficiently wide band is ensured.

However, if the dispersions in the channels are different, there is a possibility of difference between the shapes of pulses in the channels. Therefore, the optical fiber 2 is preferably selected from a dispersion flat fiber (DFF) providing a suitable value of normal dispersion and a fiber having a small dispersion slope.

The optical fiber 16 preferably has a band wide enough to uniformly compensate for the dispersions in all the channels. In this case, the dispersion compensation is performed by using anomalous dispersion, so that a DFF having a zero dispersion slope is preferably used and the flat region of the DFF is preferably ensured to be wider than the band of the WDM signal light. In the case that the optical fiber 2 is not a DFF, however, an anomalous dispersive fiber having a suitable value of dispersion and a sign reversed to that of the optical fiber 2 with the opposite slope may be used as the optical fiber 16.

The optical fiber 22 on the front stage in the pulse compressor 20 is required to provide large up-chirp for pulse compression. Accordingly, characteristics required for the optical fiber 22 are basically the same as those required for the optical fiber 2. That is, the optical fiber 22 is preferably selected from a DFF providing a suitable value of normal dispersion and a fiber having a small dispersion slope.

On the other hand, characteristics required for the optical fiber 24 on the rear stage in the pulse compressor 20 are basically similar to those required for the optical fiber 16.

Each of the optical amplifiers 6 and 6' preferably has a flat band enough to amplify all the optical signals in the band of the WDM signal light with substantially the same gain.

(b) Optical Filter Design

Figure 11:
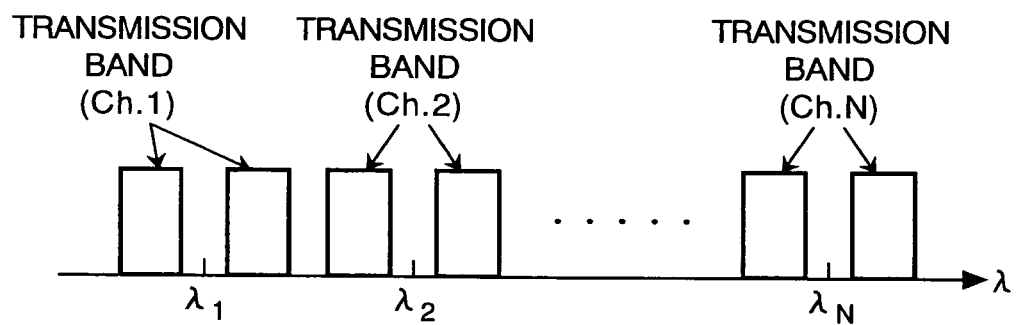
FIG. 11 is a diagram for illustrating the transmission bands of an optical filter suitable for WDM signal light.

For simultaneous filtering of the WDM signal light simultaneously chirped, a special filter having characteristics as shown in FIG. 11, for example, is preferably adopted. Basically, it is sufficient to prepare a pair of transmission bands as shown in FIG. 5 for the wavelength of each channel of the WDM signal light. The optical bandstop filter may be configured by cascading a plurality of fiber gratings having different stop bands whose center wavelengths respectively coincide with the wavelengths $\lambda_1$ to $\lambda_N$ of the WDM signal light, wherein the WDM signal light is passed through these cascaded fiber gratings. The optical bandpass filter may be configured by using an interleave filter already put to practical use. Further, an interleave filter or the like may be provided upstream of the regenerating device 32 as required so that the WDM signal light is passed through the interleave filter prior to inputting into the regenerating device 32, thereby preliminarily removing ASE noise outside of a signal band. With this arrangement, high-accuracy regeneration of the optical signal in each channel can be achieved. The interleave filter may be located immediately upstream of the optical fiber 2 in the regenerating device 32.

As a modulation method for each channel of the WDM signal light, an optical amplitude (intensity) modulation method or the like is applicable. In this case, signal detection may be effected by separating the WDM signal light received by the receiver 36 into optical signals of individual channels by means of a bandpass filter and then performing optical direct detection or the like.

As each of the optical fiber transmission lines 30 and 34, a single-mode silica fiber (SMF) may be used. Examples of the single-mode silica fiber include a 1.3-μm zero-dispersion fiber and a 1.55-μm dispersion shifted fiber (DSF).

Each of the optical fiber transmission lines 30 and 34 may be an optical amplifier repeater transmission line including at least one optical amplifier. In this case, attenuation of the optical signals can be compensated by the optical amplifier, thereby allowing long-haul transmission.

In carrying out the present invention, it is preferable to preliminarily compensate for waveform distortion due to the GVD or nonlinear effects in each of the optical fiber transmission lines 30 and 34, so as to effectively generate the chirp. To this end, a dispersion compensator or an optical phase conjugator may be arranged along each of the optical fiber transmission lines 30 and 34. Further, the present invention is applicable also to optical soliton transmission.

According to the present invention, ASE noise can be suppressed. Accordingly, in the case that the optical signal regenerating device according to the present invention is used as a repeater, the OSNR in a transmission line can be improved. Further, in the case that the optical signal regenerating device according to the present invention is used as a receiver, the receiver sensitivity can be improved.

Finally, a chirp compensating method will now be described. The regenerated pulse obtained by the method described above still has a chirp. Since the most expected use of the regenerating device is an optical repeater arranged along a transmission line, it is preferable to preliminarily compensate for the chirp remaining in the regenerated pulse to be output from the optical repeater, so as to eliminate an adverse effect on subsequent transmission characteristics. The chirp compensation may be effected by using optical phase conjugation (OPC) as a first method. By applying OPC to the regenerated pulse, the chirp can be reversed in sign. Accordingly, the chirp compensation can be effected by following the same procedure to further perform the regeneration of the optical signal in accordance with the present invention and thereby to generate a similar chirp.

A preferable type of OPC is not accompanied by wavelength shift. However, in the case that the regeneration of an optical signal may be accompanied by wavelength conversion, another type of OPC accompanied by wavelength shift may be used.

A second method for chirp compensation is using the fact that the chirps at the leading portion and the trailing portion of a pulse are opposite in sign to each other. This method will now be described more specifically with reference to FIG. 12.

FIG. 12 is a block diagram showing a seventh preferred embodiment of the device for regenerating an optical signal according to the present invention. In contrast to the preferred embodiment shown in FIG. 7, the seventh preferred embodiment is characterized in that an optical fiber 40 for providing normal dispersion is additionally provided between the optical bandstop filter 8 and the optical fiber 16 as a dispersion compensator for providing anomalous dispersion. The chirp by the optical fiber 2 and the band of the optical bandstop filter 8 are adjusted so that the pulse waveform of the output optical signal from the optical bandstop filter 8 is temporally divided into two parts as shown by reference numeral 10'. This output optical signal is amplified by an optical amplifier 38, and then supplied to the optical fiber 40 with a sufficient power. In the optical fiber 40, the trailing portion (near the center of the original pulse) of the leading pulse undergoes positive chirp, and the leading portion of the trailing pulse undergoes negative chirp. On the other hand, the leading pulse corresponds to a pulse portion having undergone negative chirp in the optical fiber 2, and the trailing pulse corresponds to a pulse portion having undergone positive chirp in the optical fiber 2. Accordingly, by applying the second chirping to the optical signal in the optical fiber 40 as mentioned above, the chirp at the central portion of the pulse can be compensated, and simultaneously the central hole of the pulse can also be compensated as shown by reference numeral 42. The pulse thus obtained is supplied to the optical fiber 16 as a dispersion compensator as in the preferred embodiment shown in FIG. 7, thereby allowing accurate regeneration of the optical signal.

Further, of the pulse chirped by the optical fiber 2, only a positive-chirped component at the trailing portion (or a negative-chirped component at the leading portion) may be filtered (at this time, the center wavelength of each portion is shifted from the center wavelength of the input signal pulse). Then, the above positive (or negative) chirp may be compensated by negative chirp at the trailing portion (or positive chirp at the leading portion). In the second chirping by the optical fiber 40, a signal extracting optical filter having a center wavelength coinciding with the center wavelength of the input signal pulse may be used.

While an optical fiber is used as the optical waveguide structure for providing a nonlinear effect in each preferred embodiment of the present invention, the optical fiber is merely illustrative and the optical waveguide structure in the present invention is not limited to the optical fiber. For example, an optical waveguide formed on a waveguide substrate or a semiconductor optical amplifier (SOA) provided as a semiconductor chip can provide a nonlinear optical effect, so that the present invention is applicable also to such optical waveguide structures other than the optical fiber.

According to the present invention as described above, it is possible to provide a novel method, device, and system for regeneration of an optical signal independent of the bit rate, pulse shape, etc. of the optical signal. Further, according to the present invention, it is also possible to provide a method, device, and system for regeneration of an optical signal suitable for WDM (wavelength division multiplexing). The effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising:
    inputting an optical signal into an optical waveguide structure for providing a nonlinear effect;
    generating chirp in said optical signal by said nonlinear effect; and
    supplying an output optical signal output from said optical waveguide structure to an optical filter having transmission bands at longer and shorter wavelength sides than a center wavelength of said output optical signal output from said optical waveguide structure to remove a component in which said chirp is small from said output optical signal, said transmission bands at longer and shorter wavelength sides being longer and shorter for a predetermined wavelength distant from said center wavelength.

2. A method according to claim 1, wherein said optical waveguide structure comprises an optical fiber for providing normal dispersion.

3. A method according to claim 1, wherein said optical filter comprises an optical bandstop filter having a center wavelength substantially coinciding with the center wavelength of said optical signal.

4. A method according to claim 3, further comprising supplying said output optical signal to an optical bandpass filter to remove a component in which said chirp is larger than that in a main slope portion of a pulse of said optical signal.

5. A method according to claim 1, further comprising supplying said optical signal to be input into said optical waveguide structure to an optical filter to remove a noise component outside of a signal band in said optical signal.

6. A method according to claim 1, further comprising optically amplifying said optical signal to be input into said optical waveguide structure so that a required amount of chirp is obtained.

7. A method according to claim 1, further comprising supplying said output optical signal to a dispersion compensator so that said output optical signal undergoes dispersion compensation.

8. A method according to claim 7, wherein:
said optical waveguide structure comprises a first optical fiber for providing normal dispersion; and
said dispersion compensator comprises a second optical fiber for providing anomalous dispersion;
said method further comprising adjusting a dispersion and input power of said second optical fiber so that pulse compression is performed to such an extent that a defect near the pulse peak of an optical signal output from said second optical fiber is reduced.

9. A method according to claim 8, further comprising supplying said optical signal output from said second optical fiber to an optical bandpass filter so that the pulse width of said optical signal output from said second optical fiber substantially coincides with the pulse width of said optical signal input into said first optical fiber.

10. A method according to claim 1, further comprising performing pulse compression on said optical signal to be input into said optical waveguide structure.

11. A method according to claim 10, wherein said pulse compression performing step comprises:
amplifying said optical signal to be input into said optical waveguide structure; and
passing the amplified said optical signal through a first optical fiber for providing normal dispersion and a second optical fiber for providing anomalous dispersion.

12. A method according to claim 1, wherein said optical signal to be input into said optical waveguide structure comprises WDM signal light obtained by wavelength division multiplexing a plurality of optical signals.

13. A method according to claim 12, wherein said optical waveguide structure comprises an optical fiber for providing normal dispersion, said optical fiber having a dispersion large enough to eliminate the occurrence of crosstalk between channels of said WDM signal light.

14. A device comprising:
an optical waveguide structure for providing a nonlinear optical effect so that chirp is generated in an optical signal input; and
an optical filter having transmission bands at longer and shorter wavelength sides than a center wavelength of said output optical signal output from said optical waveguide structure for accepting an output optical signal output from said optical waveguide structure to remove components in which said chirp is small and large from said output optical signal, said transmission bands at longer and shorter wavelength sides being longer and shorter for a predetermined wavelength distant from said center wavelength.

15. A device according to claim 14, wherein said optical waveguide structure comprises an optical fiber for providing normal dispersion.

16. A device according to claim 15, further comprising a dispersion compensator for accepting said output optical signal.

17. A device according to claim 16, wherein:
said optical waveguide structure comprises a first optical fiber for providing normal dispersion; and
said dispersion compensator comprises a second optical fiber for providing anomalous dispersion;
said device further comprising an optical bandpass filter for accepting an optical signal output from said second optical fiber so that the pulse width of said optical signal output from said second optical fiber substantially coincides with the pulse width of said optical signal input into said first optical fiber.

18. A device according to claim 14, wherein said optical filter comprises an optical bandstop filter having a center wavelength substantially coinciding with the center wavelength of said optical signal.

19. A device according to claim 18, further comprising an optical bandpass filter for accepting said output optical signal to remove a component in which said chirp is larger than that in a main slope portion of a pulse of said optical signal.

20. A device according to claim 14, further comprising an optical filter for accepting said optical signal to be input into said optical waveguide structure to remove a noise component outside of a signal band in said optical signal.

21. A device according to claim 14, further comprising an optical amplifier for optically amplifying said optical signal to be input into said optical waveguide structure so that a required amount of chirp is obtained.

22. A device according to claim 14, further comprising means for performing pulse compression on said optical signal to be input into said optical waveguide structure.

23. A device according to claim 22, wherein said pulse compression performing means comprises a first optical fiber for providing normal dispersion and a second optical fiber for providing anomalous dispersion.

24. A device according to claim 14, wherein said optical signal to be input into said optical waveguide structure comprises WDM signal light obtained by wavelength division multiplexing a plurality of optical signals.

25. A device according to claim 24, wherein said optical waveguide structure comprises an optical fiber for providing normal dispersion, said optical fiber having a dispersion large enough to eliminate the occurrence of crosstalk between channels of said WDM signal light.

26. A device according to claim 14, wherein:
said optical waveguide structure comprises a first optical fiber for providing normal dispersion;
said device further comprising an optical amplifier for amplifying an optical signal output from said optical filter, and a second optical fiber for accepting an optical signal amplified by said optical amplifier;
said second optical fiber providing normal dispersion.

27. A system comprising:
an optical fiber transmission line for transmitting an optical signal; and
an optical signal regenerating device for accepting an optical signal output from said optical fiber transmission line;
said optical signal regenerating device comprising an optical waveguide structure for providing a nonlinear optical effect so that chirp is generated in said optical signal supplied, and an optical filter having transmission bands at longer and shorter wavelength sides than a center wavelength of said output optical signal output from said optical waveguide structure for accepting an output optical signal output from said optical waveguide structure to remove a component in which said chirp is small and large from said output optical signal, said transmission bands at longer and shorter wavelength sides being longer and shorter for a predetermined wavelength distant from said center wavelength.

28. A system according to claim 27, further comprising a second optical fiber transmission line for transmitting said output optical signal.

29. A system according to claim 28, further comprising an optical transmitter connected to an input end of said optical fiber transmission line, and an optical receiver connected to an output end of said second optical fiber transmission line.

30. A system according to claim 27, wherein said optical signal transmitted by said optical fiber transmission line comprises WDM signal light obtained by wavelength division multiplexing a plurality of optical signals.

31. A system according to claim 28, wherein each of said optical fiber transmission line and said second optical fiber transmission line comprises an optical amplifier repeater transmission line including at least one optical amplifier.

32. A method according to claim 1, wherein:

said optical waveguide structure comprises a first optical fiber for providing normal dispersion;

said method further comprising the step of amplifying an optical signal output from said optical filter and supplying an amplified optical signal to a second optical fiber for providing normal dispersion.

* * * * *